May 26, 1970 W. A. BLEWITT ET AL 3,513,855
STRAW RACK DRIVE
Filed Aug. 30, 1967 2 Sheets-Sheet 1
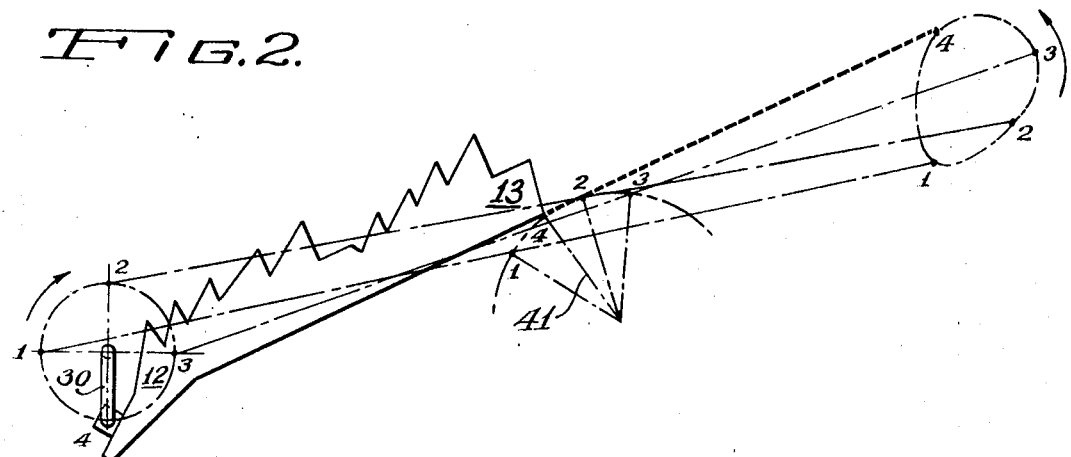
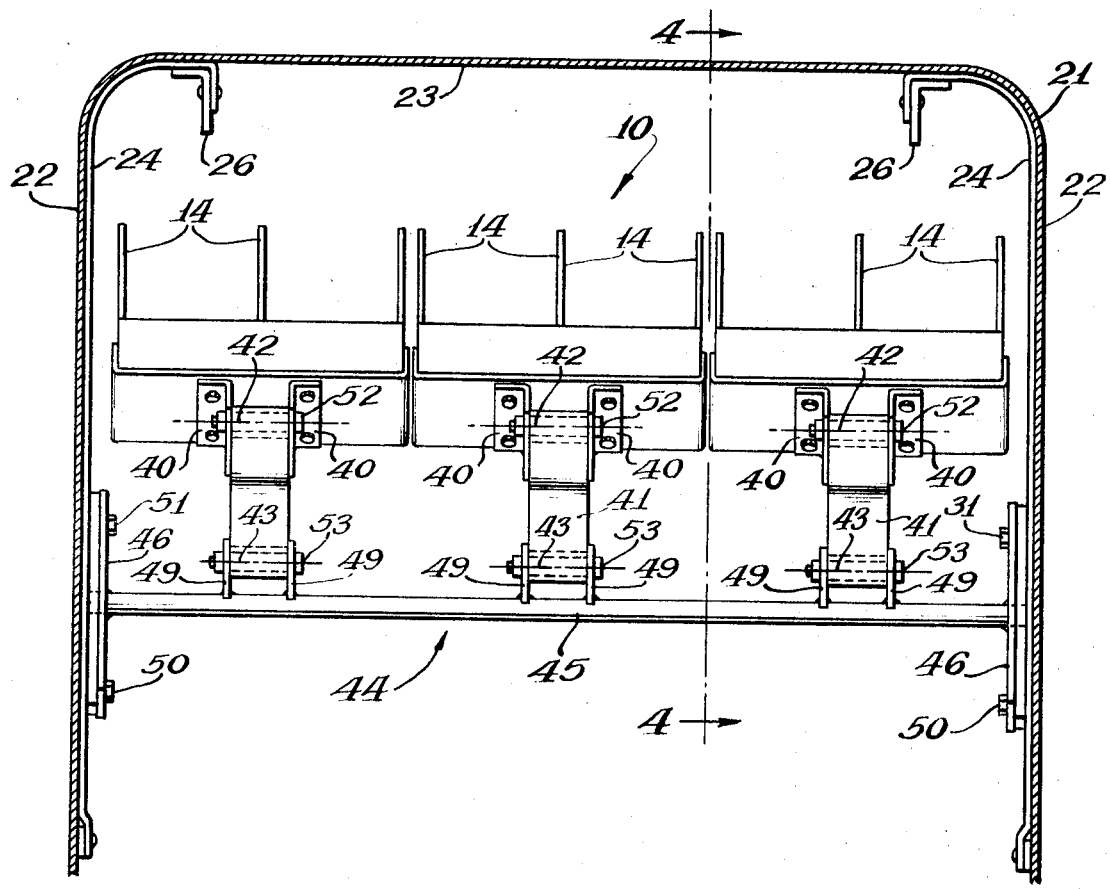
Inventor:
Donald A. McCallum
William A. Blewitt

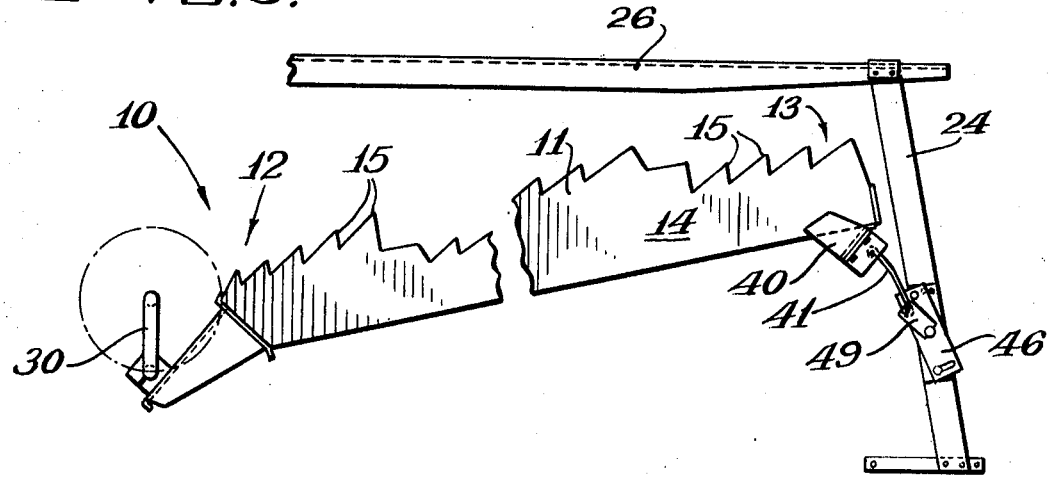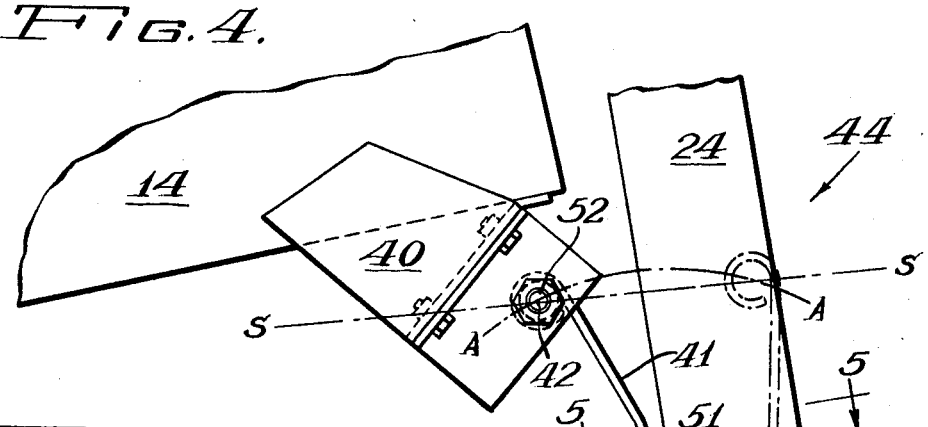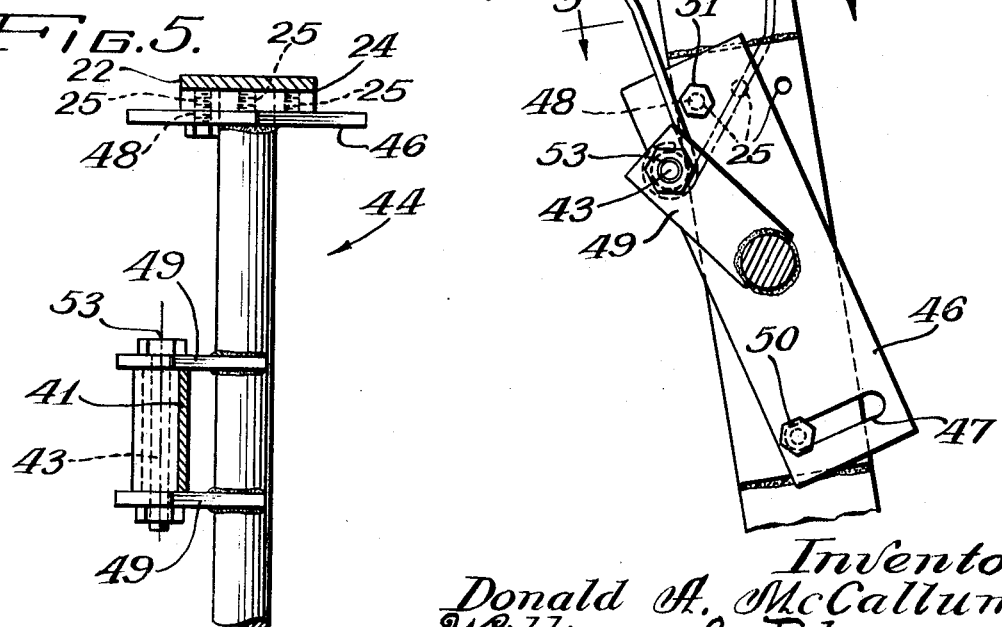

3,513,855
STRAW RACK DRIVE
William A. Blewitt, Hamilton, Ontario, and Donald A. McCallum, Burlington, Ontario, Canada, assignors to International Harvester Company, Chicago, Ill., a corporation of Delaware
Filed Aug. 30, 1967, Ser. No. 664,470
Int. Cl. A01f 12/30
U.S. Cl. 130—26
1 Claim

ABSTRACT OF THE DISCLOSURE

A grain separating apparatus that is driven at its front end about an orbital path and is supported by free swinging links located adjacent the rear end. The links extend downwardly from the grain separating apparatus and are pivotally connected to adjustable mounting means. The mounting means is adjustable to vary the pivot point within a specific range. The orbital drive and the link support causes the rear end of the grain separating apparatus to be oscillated about an arc.

BACKGROUND OF THE INVENTION

Field of the invention

The present invention relates generally to improvements in grain separators and the like and more particularly to a new and improved drive for a straw walker type carrier.

Description of the prior art

The separating section of a combine receives the bulky material from the combine's threshing section. This bulky material includes the stems, straw, cobs and debris. The bulky material also includes grain, some of which is still attached and others of which is unattached but is being carried by the other material. The purpose of the separating section of the combine is to spread the bulky material in a relatively thin layer and feed the layer over a substantial distance. The thin layer of material is agitated as it is being fed and in this period of time ample opportunity is afforded for all unattached grain to filter through the material. The agitation should be sufficient to release any grain that is still attached and permit it to filter through the layer of material. Grain separating devices of this type are disclosed in the patents to Jones No. 1,461,314 of July 10, 1923 and Oberholtz No. 2,814,300 of Nov. 26, 1957. In each of these patents, the front and rear ends of the grain separator are moved in orbital paths by crankshafts and the upper surfaces of the grain separators have teeth that will permit the material to move easily in one direction and retard its movement in the other. Thus an action is created causing the material to progress in increments from the front to the rear end of the grain separator. As evidenced by the several embodiments shown in the above referred to Oberholtz patent, conventional grain separators are made either as a single unit or in a plurality of units that are out of phase with each other. It is also known in the prior art to utilize a drive for the grain separator that oscillates rather than rotates both ends of the separator. In the drives used in the prior art special care must be taken to insure that the front and rear crankshafts are in phase, since if they are not in phase, the motion will be erratic and proper conveying and tumbling will not occur. Another drawback in the prior art drive systems is their adjustability to a particular crop or crop condition. In the prior art devices when the speed of the crankshaft is increased, there is both an increase in the aggressiveness of the tumbling and an increase in the speed at which the material is conveyed along the separator. Thus the material will be subjected to more aggressive agitation but for a shorter period of time which does not necessarily result in increased separation.

SUMMARY

The general purpose of this invention is to provide a drive for a grain separator which embraces all the advantages of similarly employed drives and possesses none of the aforedescribed disadvantages. To attain this, the present invention contemplates a unique drive that transmits a peculiar motion to the grain separator that is responsible for a considerable reduction in grain losses.

The grain separator may be of the single unit type known as a "straw rack" or multiple unit type (usually three) known as a "straw walker." A crankshaft or its equivalent is connected to the front end of the grain separator causing it to move in an orbital path. The rear end of the grain separator is supported by links that are arranged to permit oscillating movement. The fixed pivot point of the link is adjustable within a specific range such that there is always an elevation between the forward extent of the arc and the rear extent of the arc. Thus the secant of this arc will always incline toward the rear. The oscillating end of the link is connected at or near the rear end of the grain separator. This drive arrangement imparts a peculiar motion to the grain separator that subjects the material to an aggressive tumbling action, resulting in a considerable grain saving. The aggressiveness of the tumbling action can be adjusted without changing the speed of the drive to the grain separator. This is a very important feature since it permits the grain separator to be trimmed for the particular crop or crop condition and to operate efficiently under all conditions.

An object of the present invention is to provide an improved grain separator drive that will impart a peculiar motion resulting in a saving of grain.

Another object of the invention is to provide a new and improved drive for a grain separator in which the aggressiveness of the tumbling action can be varied without changing the speed of the input drive.

These and other objects of the invention will become more apparent from the specification and drawings wherein:

BRIEF DESCRIPTION OF THE DRAWING

FIG. 1 is an end view of a grain separating device having the enclosure cut away for clarity;

FIG. 2 is a geometric representation of applicant's drive illustrating the criticality of the location of the link;

FIG. 3 is a side view of the grain separating device with the enclosure removed;

FIG. 4 is an enlarged side view of the rear end of the separating device taken along lines 4—4 of FIG. 1; and FIG. 5 is a plan view taken along lines 5—5 of FIG. 4.

DESCRIPTION OF THE PREFERRED EMBODIMENT

Referring now to the drawings wherein like reference characters designatel ike or corresponding parts throughout the several views, there is shown in FIG. 1 the grain separating device 10 surrounded by an enclosure 21 having a top 23 and vertical side walls 22. The vertical side walls 22 of the enclosure are connected to vertical supports 24 which in turn are tied into the horizontal frame members 26. As can be seen in FIG. 4, a series of apertures 25 are formed in each of the vertical supports 24 for a purpose to be discussed more fully.

As can be best seen in FIG. 3, the grain separating device comprises an elongated shaking element 11 having an open surface through which grain and small particles can pass. The elongated shaking element 11 has a receiving end designated 12 and a discharge end designated 13. The shaking element 11 includes several risers 14 having teeth 15 formed along the upper edge. The teeth are shaped such that the material can readily move from the receiving end 12 towards the discharge end but is prevented by the teeth from moving in the opposite direction.

The receiving end 12 of the grain separating device is connected to a drive means such as a crankshaft 30. The crankshaft 30 is rotated and imparts an orbital motion to the receiving end 12 of the separating device.

Mounting means 44 are carried by the vertical supports 24 and are located adjacent the discharge end 13 of the separating device. The mounting means 44 comprise an elongated shaft 45 having a face plate 46 secured to each end. Each of the face plates has a slot 47 and an aperture 48 formed therein. Fastening means 50 such as a nut and bolt pass through the slot 47 and are anchored in the vertical supports 24. Fastening means 51 pass through the apertures 48 at a selected one of the apertures 25 formed in the vertical supports 24. Thus the position or attitude of the mounting means 44 can be adjusted by rotating about the axis of the shaft 45 and securing it in the selected position by tightening the fastening means 50 and 51. As can be best seen in FIGS. 2, 4 and 5, sets of radially extending trunnions 49 are secured to the shaft 45. One set of radially extending trunnions 49 are provided for each section of the grain separating device. In FIG. 1 there are three sections of the grain separating device and thus three sets of radially extending trunnions. A bracket means 40 is secured to the under surface of each section of the grain separating device. The free end of the brackets 40 support pivot shafts 52 ad the free ends of the radially extending trunnions 49 support pivot shafts 53. Link means 41 are connected respectively at a first pivot point 42 ad a second pivot point 43 to pivot shafts 52 and 53.

The rotation of crankshaft 30 moves the receiving end 12 of the grain separating device along an orbital path and causes the discharge end 13 to oscillate about an arc designated A—A as seen in FIG. 4. It is important for the proper operation of this drive that there be an elevation from the forward extent of the arc A—A to the rearward extent. A secant line designated S—S in FIG. 4 is drawn through the forward extent and the rearward extent of the arc A—A. As seen in this figure, the secant line S—S is elevated towards the rear. It has been found that with a zero elevation, bunching occurred even in very light material, and it is important that the secant be elevated toward the rear.

It has been found that the location of the first pivot point 42 with respect to the elongated shaking element 11 is critical in the attainment of high efficiency and low grain losses. Referring now to FIG. 2, there is shown an elongated shaking element driven at its receiving end by a crankshaft 30 and supported at its discharge end 13 by link means 41. For the purpose of illustrating the importance of locating link means 41 at the discharge end of the elongated shaking element, the bottom edge of the shaking element has been extended rearwardly as a broken line and the motion of this extended line analyzed. In this figure, the path of movement of the shaking element has been traced at its receiving end 12, its discharge end 13 and the end of the extended broken line. At the receiving end, the crank shaft 30 causes the shaking element to be moved in a clockwise orbital path. The discharge end 13 of the shaking element shown in FIG. 2 oscillates about an arc and the secant of this arc is inclined rearwardly. The end of the extended broken line moves in a counterclockwise orbit. If material were deposited on the receiving end 12 of the shaking element, it would progress smoothly in a direction towards the discharge end 13. However, if the shaking element is extended as represented by the extended broken line, then the reverse motion becomes effective and the rearward movement of the material is retarded at points rearwardly of link 41. Thus it is important for the proper operation of applicant's device that the link means 41 be connected to the shaking element at a point adjacent the dishcarge end of the shaking element.

The aggressiveness of the tumbling action imparted to the material carried by the shaking element is related to the amount of elevation between the forward extent of the arc and the rearward extent. The amplitude of this elevation can be adjusted by releasing the fastening means 50 and 51 and pivoting the shaft 45 about its axis. When the fastening means 51 is inserted in a different aperture 25, the second pivot point 43 is raised and shifted rearwardly. By so shifting the second pivot point 43 the resultant secant S—S will be inclined at a steeper angle and the material carried by the shaking element will be subjected to a more aggressive tumbling action. It should be noted that the aggressiveness of the tumbling action can be changed without changing the speed of the crank shaft. 30.

It should be understood, of course, that the foregoing disclosure related to only a preferred embodiment of the invention and that numerous modifications or alterations may be made therein without departing from the spirit and the scope of the invention as set forth in the appended claim.

What is claimed is:
1. A harvesting machine having:
a frame which includes an enclosure having vertical side walls, and
a grain separating device comprising an elongated shaking element for receiving threshed material at a receiving end and adapted to convey it towards the discharge end, said shaking element having an open surface through which part of the material can drop,
drive means carried bp said frame and connected to said receiving end of the shaking element, said drive means adapted to transmit an orbital motion to said receiving end,
mounting means carried by said frame,
link means pivotally connected at one end to a first pivot point at the discharge end of the shaking element and at a second pivot point on said mounting means such that said drive means transmits, through said shaking element, an oscillating motion to said discharge end causing said first pivot point to move in an arcuate path,
said second pivot point located with respect to the arc traced by said first pivot point such that the secant of said arc inclines towards the rear,
said mounting means adjustable within a range such that said second pivot point is always located with respect to the arc traced by said first pivot point such that the secant of said arc inclines towards the rear,
said mounting means including an adjustable shaft having integral face plates at each end,
said face plates being arcuately, adjustably attached to said vertical side walls such that said shaft can be adjustable about its axis,
radial extending trunnions carried by said shaft including means at their free ends for pivotable connection to said second pivot point of the link means whereby rotation of said shaft will rotate said trunnions and modify the motion of said shaking element.

References Cited

UNITED STATES PATENTS

| | | | |
|---|---|---|---|
| 379,762 | 3/1888 | Butterworth et al. | 130—26 |
| 858,294 | 6/1907 | Koester | 130—26 |

FOREIGN PATENTS

| | | |
|---|---|---|
| 762,262 | 11/1956 | Great Britain. |

ANTONIO F. GUIDA, Primary Examiner